Patented May 25, 1926.

1,585,779

UNITED STATES PATENT OFFICE.

JOHN WESLEY MARDEN, OF EAST ORANGE, NEW JERSEY, ASSIGNOR TO WESTINGHOUSE LAMP COMPANY, A CORPORATION OF PENNSYLVANIA.

PRODUCTION OF REFRACTORY OXIDE WARE.

No Drawing.    Application filed March 8, 1922.    Serial No. 542,134.

The present invention relates to the production of refractory ware and more particularly relates to a method of producing crucibles and other articles of thoria, zirconia and the like, and the product thereof.

An object of my invention is the provision of a method for economically and expeditiously producing crucibles and other articles, of refractory material such as thoria or zirconia.

A further object of my invention is the provision of a compound containing a refractory material such as thoria and the like which may be conveniently employed in casting crucibles, pots, tubes for tungsten-wound furnaces and the like.

A further object of my invention is the provision of a casting process for the production of thoria crucibles.

A further object of my invention is the production of a cast crucible composed primarily of thoria.

Other objects will be apparent from a reading of the following description.

In practicing many metallurgical processes, it is desirable to prevent the contamination of the material undergoing treatment. This is particularly true when investigations are being made of the metals which require high-heat treatments. It is known, for instance, that magnesia, lime and even zirconia cannot be used in contact with tungsten or molybdenum on account of the interaction between the metal and the oxide. In the case of a lime crucible, for example, tungsten interacts with this oxide to yield volatile products which are probably calcium metal and tungstic oxide. For this reason and many others, attempts have been made to produce crucibles and other articles, used in connection with metallurgical investigations, from the refractory oxides, especially thorium oxide and zirconium oxide. Inasmuch as thorium oxide, when highly heated is one of the most refractory of substances, above that of platinum, and also because its chemical resistivity is very great, it will be appreciated that a vessel, such as a crucible or a tube for an electric furnace, composed of practically the pure oxide will find considerable usage in fusing metals having relatively high melting points, such as thorium and zirconium, and also in practicing other metallurgical processes, as, for instance, the determination of silica in the chemical laboratory. Another important factor which is favorable to the employment of thoria and zirconia in crucible manufacture is that these compounds have low coefficients of expansions. It is also believed that a substantially pure thoria crucible would be of considerable advantage in treating certain ores, because direct treatment with hydrofluoric acid could be resorted to.

As already stated, many attempts have been made to produce crucibles from refractory materials, such as magnesia, thoria, zirconia, etc., but, so far as I am aware, no one has been able to manufacture these articles on a commercial scale because of the difficulties encountered in handling these non-plastic materials. In certain of the processes practiced, recourse has been had to the employment of a binder such as starch, gelatine, gum and the like. The principal objection to the use of these binders is that impurities are thereby introduced into the finished article which, obviously, may seriously interfere with the successful practicing of a metallurgical process. An illustration of this has already been given when tungsten is undergoing treatment in a lime crucible. Many other instances might be cited, especially where the crucibles are contaminated with graphite or carbon.

So far as I am aware, no successful casting process has been devised for the production of refractory crucibles free from carbonaceous and siliceous substances. The advantages derived from having a comparatively pure refractory crucible are obvious from the foregoing description.

Briefly stated, the process of casting, as practiced by me in producing crucibles of substantially pure refractory substances, consists in forming a suspension of suitable consistency for casting. This suspension, which is usually termed the "slip" in the pottery industry, is prepared by thoroughly intermingling, by means of a ball mill, the refractory substance of which the crucible is principally composed, a small quantity of another refractory material, to serve as a filler, a binder salt, preferably a double fluoride salt, which functions similarly to a colloid, and a small quantity of a suitable acid which will cause any colloid present to coagulate. When the mixture has been ground very finely, it is mixed with about an equal part of the refractory substance which has been previously pulverized until quite fine. This mixture is diluted a little with water to give a suitable consistency for casting. This suspension, which is termed the "slip" is poured into a plaster of Paris mold having the proper degree of moisture. The mold is kept full for a few seconds or minutes, depending upon the dryness of the form, the proportion of water in the slip and the thickness of walls desired on the crucible. When the desired thickness is obtained, the excess "slip" is poured out. The form and cast crucible are allowed to dry and harden. In drying, the crucible shrinks away from the walls of the casting form and may then be turned out into the hand. After being carefully dried, the crucible is fired at about 1200° C., at which time most of the salts are volatilized and the crucible takes on a permanent set.

Care should be exercised in having the proper degree of moisture in the casting forms, as there is a tendency for the casting to stick or crack if the form is too dry, whereas, if it is too wet, good results are not obtainable.

Another important consideration is the drying of the casting, for, if the drying step is carried on too rapidly, the casting will crack. Generally speaking, the drying depends on the size of the article, the larger the vessel, the longer the time required for drying. Furthermore, the drying temperature should be gradually raised until the maximum temperature has been reached at which temperature the drying operation should be continued for a short interval.

The proportions of binder salt and the fineness of sub-division may be varied within quite liberal limits, and, therefore, no directions can be set down with much exactness.

A specific example may be helpful in order to understand the process practiced by me. It is to be understood that, in practicing this process, variations may be made in the quantities of materials employed, the nature of such materials, and the periods of time required for certain of the operations.

In casting thoria crucibles, I first prepare a mixture of approximately nine parts of thoria which has been previously ignited at 1700 to 1900° C., about one part of zirconia, about one part of potassium-thorium fluoride, potassium-zirconium fluoride, cryolite, and the like, and a one-half part of phosphoric or other suitable acid. The mixture is ballmilled wet and, after it has been ground very finely in this way, it is mixed with an equal part of the ignited thoria which has been pulverized in the mortar to pass a 200 mesh sieve. This mixture is diluted with water to give a suspension of suitable consistency for casting.

The mold or casting form into which the "slip" is poured to form the casting, is prepared, preferably out of plaster of Paris. A solid block of plaster of Paris is turned at one end on a lathe to obtain the desired shape. A soft-soap solution is deposited over the block and the protuberance formed by turning, and the solution permitted to dry. The block is placed on a piece of board, protuberance up, surrounded with a piece of iron or card board. A mixture of four parts of plaster of Paris and three parts of water is poured into the cup thus formed and allowed to dry. When hard, the two pieces of plaster of Paris are separated. The one having the depression is retained and serves as the casting form or mold. When this form is nearly dry, it is ready for casting crucibles.

The "slip" is poured into the mold and the latter kept full until the proper thickness of walls desired on the crucible has been obtained. The "slip" hardens adjacent the mold, the central portion retaining its plastic condition. When the desired thickness has been obtained the excess "slip" is poured out and the excess solidified thoria cut away from the top of the casting form.

The form and contents are allowed to dry and harden. The crucible shrinks away from the walls of the casting form and after sufficient time may be turned out into the hand and allowed to further dry in the air. It is important, in drying, to avoid cracking the crucible and, therefore, I prefer to proceed as follows in performing this step. After removal from the mold I place the crucible in a drying box having four compartments, progressively heated from the bottom to the top, the compartment having the highest temperature being located at the bottom of the box. The crucible is first placed in the compartment having the lowest temperature, i. e., in this case, at the top, and allowed to remain for about twelve hours. In order to avoid too rapid drying in this compartment, I moisten the air by placing therein a receptacle containing water. The crucible is then placed in the next compartment for a short time, say about two hours, and so on into the remaining compartments until practically all moisture has been expelled. The temperature of this oven should range from room temperature to about 60° C.

The thoroughly dried crucible is then placed in a drying oven and heated to about 120° C. to expel the remaining moisture. This heat treatment is continued for about two hours, or until, practically all moisture has been expelled.

The crucibles are next fired by being placed in a tube furnace. The temperature of the furnace is gradually increased over a period of about two hours until a temperature of 1200° C. has been obtained at which temperature the firing is permitted to continue for about one hour. It is preferable to frequently turn the crucibles during firing in order to distribute the heat uniformly and also keep them from sagging. In order to obtain a more uniform heat distribution, a rotary kiln may be employed. During the firing process, most of the salts volatilize, the final composition of the crucible being practically pure thoria with a slight amount of zirconia. The crucible, upon removal from the kiln, should be permitted to cool. It is immaterial whether such cooling be rapid or slow, as the low coefficient of expansion of thoria makes the crucible less susceptible to temperature changes.

What is claimed is:

1. An article of manufacture composed of thoria and resulting from shaping and firing a mixture of thoria, cryolite, phosphoric acid and water.

2. An article of manufacture composed of thoria in a dense, coherent condition free from carbon, and resulting from shaping and firing a mixture of thoria, a small quantity of zirconia, potassium-thorium fluoride, phosphoric acid and water.

3. An article of manufacture composed of dense, coherent thoria free from carbon and resulting from shaping and firing a mixture of about 80% thoria, about 10% zirconia, about 10% potassium-thorium fluoride, about 5% phosphoric acid and sufficient water to form a slip.

4. A cast article composed principally of thoria.

5. A cast crucible composed principally of thoria.

6. A cast thoria crucible.

7. A silica-free thoria crucible.

8. A carbon-free thoria crucible.

9. A silica-and-carbon-free thoria crucible.

10. A slip for casting articles from refractory oxides comprising a finely divided refractory oxide, a filler, a double salt, an acid, and a sufficient quantity of water or other liquid to produce a suitable consistency for casting.

11. A slip for casting articles from refractory oxides comprising about 80% of a finely divided refractory oxide, about 10% of a filler, a double salt, a slight amount of an acid, and sufficient water to furnish proper consistency.

12. The method of casting thoria crucibles which consists in ball-milling wet a mixture of about nine parts of thoria, about one part of zirconia, about one part of potassium thorium fluoride, and about one-half part of phosphoric acid, then mixing therewith an equal part of ignited thoria, subsequently forming a "slip" of suitable consistency for casting, by adding water, casting said "slip" into a mold, removing the excess slip, drying the cast crucibles and firing.

13. The method of casting thoria crucibles and other articles which consists in forming a slip by adding a salt, an acid, and water to finely divided thoria, depositing said slip into a mold, removing the excess slip, drying the cast articles and firing.

14. The steps in the process of casting crucibles of refractory oxides which consist in ball-milling wet a mixture of about nine parts of thoria, about one part of zirconia, about one part of a double salt and about one-half parts of phosphoric acid, then mixing therewith an equal part of ignited thoria in a finely divided state and adding sufficient water to give the desired consistency.

15. The method of casting articles from refractory substances which comprises intimately mixing a substance which is to form the ultimate article, a suspending medium substantially insoluble, and water, to form a slip, casting said article from said slip, drying the cast article and firing.

16. The method of casting articles which comprises forming a slip by mixing the substance from which the article is to be formed, water, a suspending medium substantially insoluble in water and a chemical to prevent the formation of colloids, depositing said slip into a mold, removing the excess slip, drying the cast article and firing.

17. The step in the process of preparing a paste or a slip which comprises the addition to said slip of a noncolloidal suspending medium.

18. The step in the process of preparing a paste or slip for refractory ware which comprises the addition of a suspending medium which is practically insoluble in water and which does not depend upon the action of colloids in performing its function.

19. The step in the preparation of refractories for formation into shaped articles which comprises the addition to the slip from which said articles are to be made of a substantially insoluble non-colloidal suspending compound and an electrolyte.

20. The step in the process in the formation of a plastic mass from which articles are to be formed which comprises the addition to said mass while being prepared of an electrolyte to prevent the formation of colloids.

21. A suspending medium for refractory material consisting of a double fluoride salt.

22. A suspending medium for refractory material consisting of cryolite.

23. A suspending medium for a refractory compound from which articles are to be formed comprising a substantially insoluble non-colloidal substance.

24. A suspending medium for refractory substance from which articles are to be formed comprising a substantially insoluble non-colloidal salt.

25. A refractory support for the heat treatment of materials consisting of a non-fragile, coherent body composed of more than 80% of thorium oxide and free from carbonaceous and siliceous materials.

26. A self supporting crucible composed of more than 80% of thorium oxide.

27. An enclosure for the heat treatment of materials consisting of a non-fragile, coherent body composed of more than 80% thorium oxide.

28. A refractory support for the heat treatment of materials at high temperatures composed of more than 80% of thorium oxide and free from ingredients capable of contaminating the materials to be treated.

29. A cast and fired article composed principally of thoria.

30. A cast and fired crucible composed principally of thoria.

In testimony whereof, I have hereunto subscribed my name this seventh day of March 1922.

JOHN WESLEY MARDEN.